June 21, 1966      H. FASOLA, JR      3,257,240
DEFERRED ACTION PRIMARY CELLS
Filed Aug. 17, 1961      3 Sheets-Sheet 1
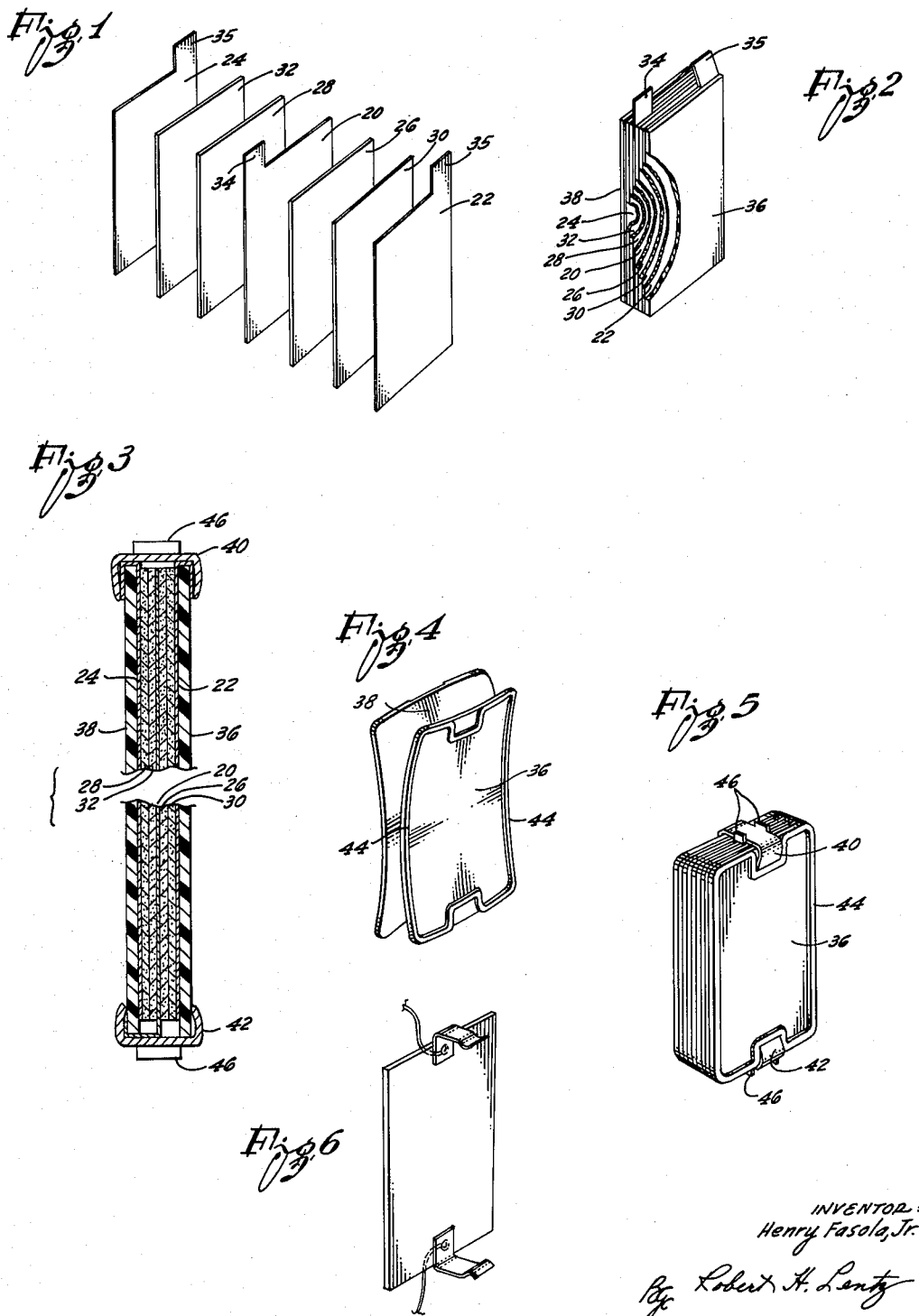

June 21, 1966　　　H. FASOLA, JR　　　3,257,240
DEFERRED ACTION PRIMARY CELLS
Filed Aug. 17, 1961　　　3 Sheets-Sheet 2
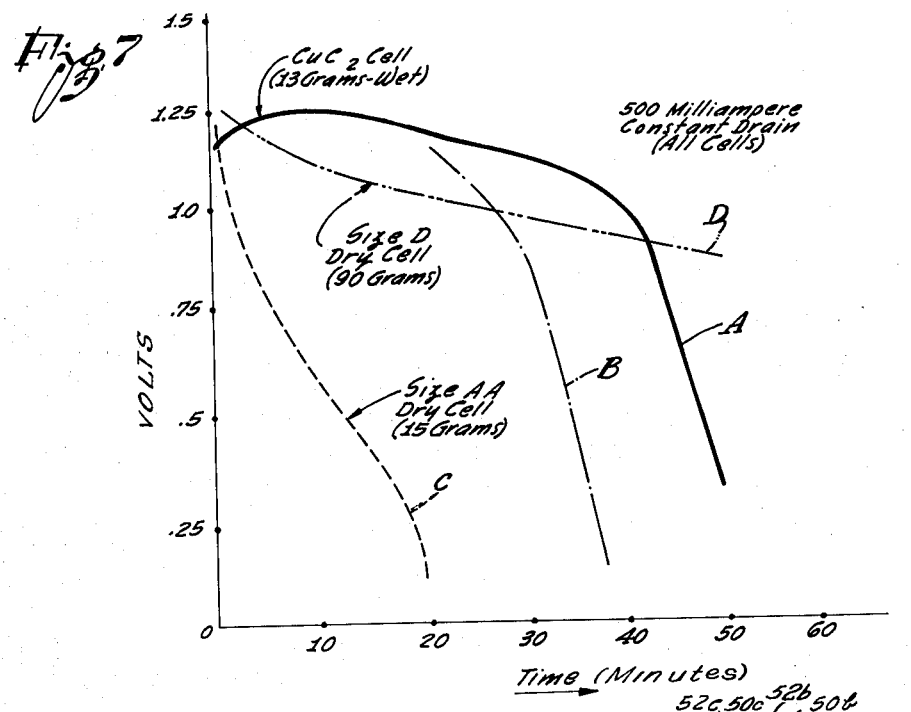
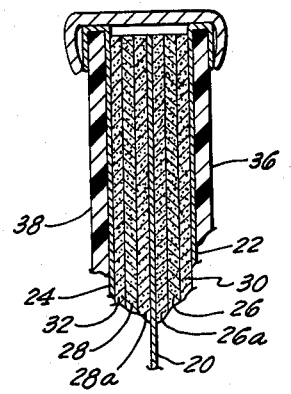
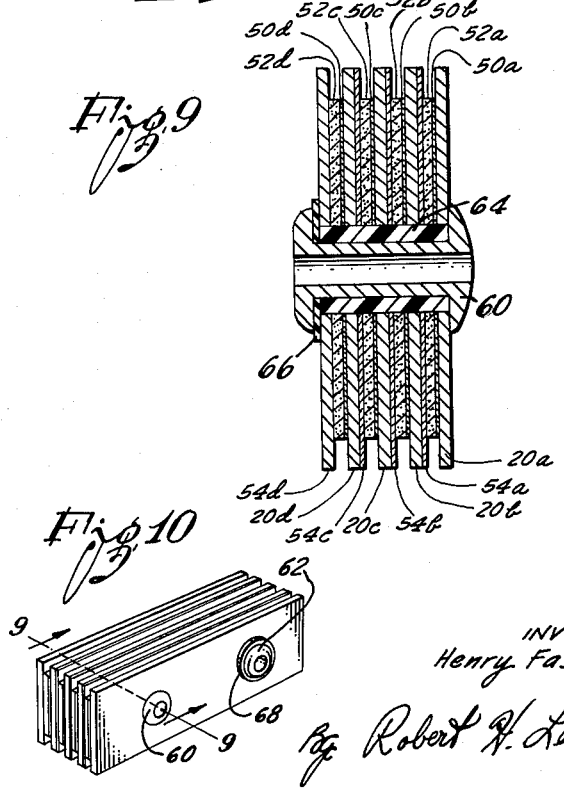
INVENTOR
Henry Fasola, Jr.
By Robert H. Lentz

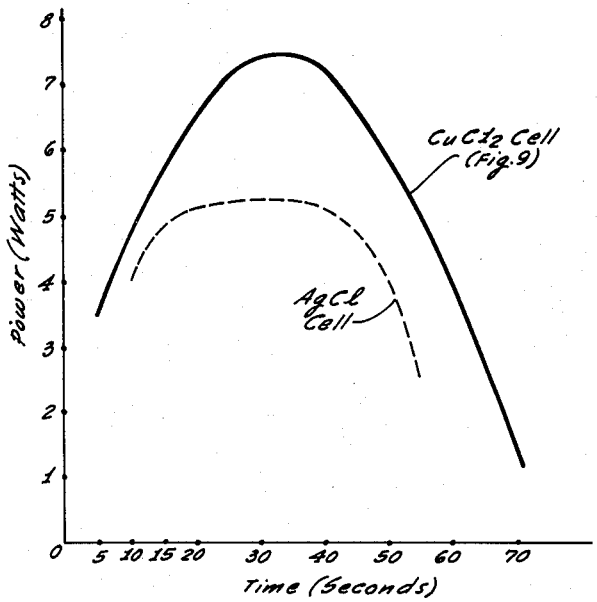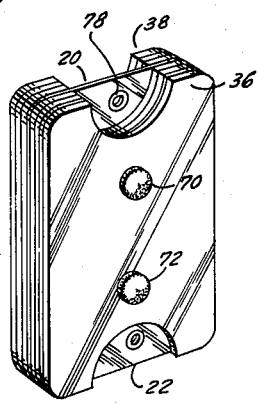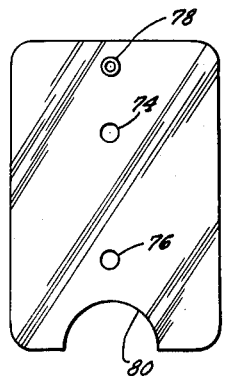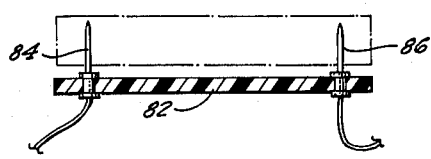

United States Patent Office 3,257,240
Patented June 21, 1966

3,257,240
DEFERRED ACTION PRIMARY CELLS
Henry Fasola, Jr., 6141 Capistrano Ave., Mar Vista, Calif.
Filed Aug. 17, 1961, Ser. No. 132,024
13 Claims. (Cl. 136—90)

This invention relates to deferred action primary cells, and more particularly to deferred action cells which contain cupric chloride as an active element thereof.

It has long been appreciated that two electrodes of different materials may be utilized to provide primary sources of electrical energy. It is also well known that numerous applications exist for deferred action primary cells which may be activated at a preselected point in time by immersion in a suitable activating fluid. Among the uses for such cells are those in guided missile power supplies, in emergency equipment such as lights and indicators, and in the model toy field. Unfortunately, the exploitation of this latter field in particular has been hampered heretofore by economic considerations.

The deferred action primary cells of the prior art may be broadly classified as those which are actuatable by immersion in water, and those which are actuatable by immersion in a chemical active electrolyte, usually a strong caustic or base solution. Cells of this latter type are frequently characterized by the fact that the cell is constructed with its electrolyte separated therefrom by a frangible partition so that the cell may be actuated by puncturing or otherwise forming an aperture in the partition. Because of the nature of the activating solution and the complicated construction of the cell, such prior art batteries are often too uneconomical or potentially dangerous for many applications.

The water activated primary cells of the prior art, on the other hand, usually employ an anode formed of a material such as magnesium and a water insoluble cathode composed of either silver chloride or cuprous chloride. In the former type of cell the cathode may be provided either by chemically creating a silver chloride layer on a sheet of silver, or by compressing a silver chloride paste over a metallic screen or grid. In either event the resulting chloride cell is relatively expensive owing to the substantial amount of silver used therein.

The cuprous chloride cells of the prior art also usually employ a cathode which is formed by compressing a cuprous chloride paste over a metallic screen or grid. The grid is then separated from the anode by one or more layers of normally dry bibulous material which absorbs the activating water when the cell is activated by immersion. It should be noted that the relative insolubility of the cuprous chloride in water contributes to permit this form of cathode construction by insuring that the cathode is not dissolved during the immersion operation.

Although cuprous chloride cells have found reasonably wide acceptance, they are nevertheless limited in application for several reasons. First, the cost of fabricating the cathode is too great to permit such cells to be employed in many applications calling for very inexpensive cells. Secondly, the current density obtainable for a given cell volume is usually relatively low unless the cell is formed in a concentrically wound spiral configuration employing extremely thin anode and cathode sheets to increase the active battery area; when this approach is followed, however, costs are driven still higher because of the increased cost of very thin sheet stock. Thirdly, for a given active area cuprous chloride cells usually exhibit a relatively high internal impedance and consequently cannot provide the optimal power output which would be preferred for many applications.

The present invention, on the other hand, overcomes the foregoing and other limitations of the deferred action primary cells of the prior art by providing a primary cell which is capable of producing an unusually large amount of electrical energy with limited internal heating. In accordance with the basic concept of the present invention there are provided deferred action cells wherein metallic anode and cathode elements have associated therewith one or more bibulous separators at least one of which contains water soluble cupric chloride.

More particularly, in its preferred form the deferred action cell of the invention includes a magnesium anode, a cathode whose surface facing the anode is composed essentially of an element from the group consisting of copper, nickel or carbon and a layer of bibulous material adjacent the cathode containing crystals of cupric chloride so that upon immersion of the battery, the cupric chloride crystals are dissolved to thereby furnish the ions requisite to current flow. In addition each cell preferably also includes one or more separator elements of bibulous material adjacent the anode for separating the cathode and anode, such separators including sodium chloride in those applications where plain water, as opposed to sea water, is employed to activate the cell.

In addition to providing inexpensive cell construction as well as superior electrical performance, the use of cupric chloride in the deferred action cells of the invention also provides means for visually verifying the condition of the cell during extended shelf life owing to the change in color of cupric chloride when its water of hydration is removed. This feature of the invention is especially significant when cells are enclosed in transparent hermetically sealed packages for storage over extended periods in high humidity atmospheres.

Another feature of the present invention is the formation of the active cathode surfaces through the application of a colloidal dispersion of either copper or carbon in a resin base. Through the use of this innovation relatively large cathodic surface areas are presented, and deposition of the cathode on either an inexpensive base metal sheet or plastic end plate is readily achieved.

Still other novel features of the present invention are provided by the manner in which the cells of the invention may be constructed with compound curved plastic end plates to ensure a tightly sandwiched final configuration, and the manner in which the completed assembly is bound together to provide simultaneously mechanical clamps for the assembly and electrical connections to the cell.

It is therefore an object of the invention to provide a relatively inexpensive deferred action primary cell which utilizes cupric chloride as an element thereof.

It is also an object of the invention to provide a deferred action cell wherein the cathode is metallic and cupric chloride is employed in conjunction therewith to provide relatively high output energy.

It is another object of the invention to provide means for clamping the active elements of deferred action cell together in intimate contact to thereby enhance the flow of electrical energy.

Still another object of the invention is to provide a deferred action primary cell which employs cupric chloride both as an active element thereof and as a visual indicia of continued operativeness when stored prior to use.

A further object of the invention is to provide improved means for constructing deferred action cells through the use of colloidal dispersions of cathodic material.

Still another object of the invention is to provide improved means for constructing deferred action cells in series through the use of metallic colloidal dispersions.

It is yet another object of the invention to provide inexpensive light-weight deferred action cells capable of use in the model toy field.

The novel features which are believed to be characteristic of the invention, both as to its organization and method of operation, together with further objects and advantages thereof, will be better understood from the following description considered in connection with the accompanying drawings in which several embodiments of the invention are illustrated by way of example. It is to be expressly understood, however, that the drawings are for the purpose of illustration and description only, and are not intended as a definition of the limits of the invention.

FIG. 1 is an exploded view of a parallel deferred action cell, according to the invention, illustrating the various active elements thereof;

FIG. 2 is an isometric view of a battery constructed utilizing the elements shown in FIG. 1;

FIG. 3 is a sectional view of an alternate embodiment of the deferred action cell of the invention illustrating another method for making electrical connections thereto;

FIG. 4 is an isometric view of a pair of plastic end plates employed in the battery of FIG. 3;

FIGS. 5 and 6 are respectively an isometric view of the battery of FIG. 3 and an isometric view of a suitable terminal board therefor;

FIG. 7 is a graph of curves illustrating comparative performance of the battery of the invention and other standard commercial dry cells;

FIG. 8 is a partial sectional view of a modified deferred action cell illustrating one method of extending cell performance;

FIGS. 9 and 10 are respectively a cross-sectional view and an isometric view of another embodiment of the deferred action cell of the invention;

FIG. 11 is a graph of curves illustrating the energy output of the cell of the invention for certain short term applications;

FIG. 12 is an isometric view of still another embodiment of the invention; and

FIGS. 13 and 14 are, respectively, a plan view of the internal electrode configuration employed in the battery of FIG. 12, and a sectional view of a typical circuit board for mounting the battery in an electrical circuit.

With reference now to the drawings, wherein like or corresponding parts are designated by the same reference characters throughout the several views, there are shown in FIG. 1 the basic elements which are assembled to form deferred action primary cells in accordance with the present invention. More particularly, the battery elements as shown in FIG. 1 are in part duplicated to provide a pair of parallel cells each constructed in accordance with the teachings of the invention, and include a common anode 20 composed of a sheet of a material high in the electrochemical series, such as magnesium, a pair of cathode elements 22 and 24, composed of material relatively low in the electrochemical series, positioned on opposite sides of the anode, a pair of porous separators 26 and 28 positioned between the anode 20 and cathodes 22 and 24, respectively, and a pair of cupric chloride containing elements 30 and 32 which are shown positioned between separator 26 and cathode 22, and separator 28 and cathode 24, respectively.

The cupric chloride containing elements 30 and 32 as well as separators 26 and 28 may be fabricated from any suitable bibulous material, such as conventional commercial grade blotting paper, for example, or other organic absorbent. The addition of cupric chloride to the bibulous material of elements 30 and 32 may be accomplished merely by dipping or otherwise immersing the dry material in a saturated aqueous solution of cupric chloride, after which the material is permitted to dry whereby the cupric chloride crystals in the solution absorbed by the material precipitate out and are retained within the network of fibers forming the bibulous material. Inasmuch as cupric chloride is highly soluble in water, it will be appreciated that the foregoing simple procedure, even when performed at room temperatures, will produce an abundance of cupric chloride crystals within the material of elements 30 and 32.

The porous separating elements 26 and 28, on the other hand, can be used directly in their original state when fabricating the battery, especially if sea water immersion is to be used for activating the battery. In general, however, it is preferable to saturate the separators first with sodium chloride which may be accomplished readily by first immersing the separators in a saturated solution of sodium chloride, and then permitting them to dry before being assembled with the other component parts of the battery.

It should be noted that the drying of the separators and of the cupric chloride containing material can be carried out under atmospheric conditions without the aid of ancillary equipment so long as the relative humidity is reasonably low. The drying process may be expedited, of course, by employing an oven or a series of infrared lamps if a continuous assembly process is contemplated.

It should also be noted that the cupric chloride containing elements characteristically assume a green coloring when dried at normal room temperatures, but will take on a brownish coloring when dried at temperatures on the order of 150° F. or more owing to removal of the water of hydration associated with the cupric chloride crystals. In instances where the completed cells are packaged hermetically for protection against accidental immersion or high relative humidity, this factor can be used in conjunction with a transparent packaging material to provide a visual indication that the cell has remained completely dry, inasmuch as the cupric chloride crystals will reabsorb the lost water of hydration under normal atmospheric conditions. Typical packaging materials which may be used are cellophane, cellulose acetate and polyvinylidene chloride.

As stated previously, anode 20 is composed of a material high in the electrochemical series, that is to say, a material which is oxidized with substantial ease as compared with hydrogen as the norm. Anodes formed essentially of magnesium have been found to function especially well, with performance related generally to the purity of the magnesium. For example, while successful results have been obtained by using AZ61 magnesium (6% aluminum, 1% zinc) and by using AZ31 magnesium (3% aluminum, 1% zinc), better battery performance in terms of electrical energy delivered has been achieved with primary magnesium, which is on the order of 99.8% magnesium with trace impurities. Because primary magnesium is also relatively ductile when compared with the previously mentioned magnesium alloys, and thus lends itself readily to automatic assembly operations, the use of primary magnesium is preferred. It should be noted, however, that for the purpose of the present invention all three of the foregoing materials, as well as any other magnesium alloys wherein the magnesium content is over 80% may be considered as being composed essentially of magnesium.

The thickness selected for the magnesium sheets is not considered critical, and excellent results have been achieved employing as an anode a sheet of magnesium as thin as ten thousandths (.010) of an inch. Moreover, magnesium sheets as thin as several thousandths could be employed without adverse effect, but such material tends to be more expensive. It should also be noted that if the magnesium sheet is made extremely thin, shorter operating life may be expected owing to the fact that the anode erodes when the battery is placed in operation.

Considering next the material employed in cathodes 22 and 24, it will be recalled that the cathode is composed of a material which is relatively low in the electrochemical series. More specifically, at least the active surface of the cathode elements facing the anode, in accordance with the invention, is composed essentially of one of the elements from the group consisting of copper, nickel or carbon. As pointed out in more detail hereinbelow when operation is discussed, after activation of the battery copper ions move to the cathode and plate out over the surface thereof facing the anode, so that the cathode eventually, if not initially, presents a copper surface to the anode. However, it has been found that the use of nickel or carbon as cathodic material provides a higher initial open circuit voltage, and thereby shortens the time required after activation of the battery for the battery to provide maximum current at any given voltage within the battery's operating range.

Illustrative of the manner in which copper can be employed as the cathode material, it has been found that a sheet of primary copper, a sheet of steel shim stock plates with copper, or a sheet of polystyrene plastic painted with a colloidal suspension of copper in a lacquer base which dries as an electrically conductive film (available commercially from the Acheson Colloids Company, Port Huron, Michigan, under the trade name "Dispersion No. 235"), all provide substantially identical performance, and except for the latter cathode material, provide in combination with an anode of primary magnesium present an open circuit voltage of approximately 1.50 to 1.55 volts. For reasons not known precisely, open circuit voltages on the order of 1.70 volts are achieved when a colloidal dispersion of copper is employed. In view of the fact that the total energy derivable from the cell is also increased, it is thought that the increased surface area provided by the colloidal particles is responsible for these effects.

Suitable results are also achieved with the various alloys which are composed primarily of copper, such as the various brasses and bronzes which customarily contain copper within the range of from 65 to 95 percent. For example, common yellow brass, which is approximately two-thirds copper and the remainder zinc, has been found to present an open circuit voltage of approximately 1.50 volts under the conditions stated above.

It should be noted that the use of copper alloys in the cathode of the battery of the invention is sometimes accompanied by local action in the cathode element which adversely affects shelf life, particularly when the completed batteries are not hermetically packaged. However, since such alloys may be employed in the battery of the invention and function in the same manner as the previously described cathodes whose surfaces are more nearly pure copper, for the purpose of the present invention such copper alloys will also be considered as being composed essentially of copper.

If it is desired to expedite battery energization through the use of a nickel cathode, it has been found most economical to plate a thin coating of nickel over the surface of a copper cathode fabricated in any of the manners set forth above. Particularly good results may be achieved easily by first plating a sheet of steel shim stock with copper, either electrically or with any of the commercially available electroless copper plating solutions, and then plating the copper with nickel. Again, this latter step may be accomplished by any of the various plating processes known to the art.

When nickel cathodes are employed in the battery of the invention, the initial open circuit voltage of the battery is found to be on the order of 1.70 volts. Because when the battery is initially actuated there is customarily a delay on the order of ten to thirty seconds during which the battery asymptotically approaches its rated capacity, it will be appreciated that the higher initial voltage provided by a nickel cathode will minimize this delay and permit operation at the desired rating more quickly.

In a similar manner, a carbon cathode surface facing the anode will also provide quicker starts, the open circuit voltage for carbon cathodes with an anode of primary magnesium being on the order of 2.0 volts. A suitable carbon surface for the cathode may be obtained by spraying or painting a colloidal suspension of carbon in lacquer (available commercially, for example, under the designation No. 194 Spray Dispersion from the Acheson Colloids Company) upon either a sheet of metal or a sheet of plastic.

Referring once more to FIG. 1, it will be understood from the foregoing description that cathode elements 22 and 24 may be either entirely metallic or plastic with a metallic coating of copper, nickel or carbon. For purposes of the description of FIG. 2 hereinbelow, it will be assumed that the cathodes of FIG. 1 are entirely metallic, while the description of the battery of FIG. 3 will demonstrate how metallically coated plastic may be used in practicing the invention.

It will be noted from FIG. 1 that anode 20 is shown to have a tabular terminal 34 on one side, while cathodes 22 and 24 include a pair of tabular terminals 35 on the side opposite to the tab on anode 20. If this particular form of construction is employed, cathodes 22 and 24 can be formed as an integral unit joined at the tops of tabs 35.

With reference now to FIG. 2, there is shown a primary cell, in accordance with the invention, which is constructed employing battery elements having the configurations shown in FIG. 1. As indicated in FIG. 2, all of the elements shown in FIG. 1 are sandwiched together between a pair of planar plastic end plates 36 and 38, respectively, the entire assembly being held together tightly by suitable means, not shown, such as end clamps, plastic rivets or the like. This general form of battery construction is well suited for use when electrical connection to the battery terminals is made by alligator clips.

Turning to FIGURES 3 through 5, there is shown another embodiment of the battery of the invention which is particularly useful in various clip-in applications. As shown in FIG. 3, the battery includes the various elements 20 through 32 described above with reference to FIG. 1, and a pair of plastic end plates 36 and 38. As further shown in FIG. 2, the cathode elements 22 and 24 extend over the top of the plastic end plates 36 and 38, as viewed in the drawing, where they are engaged by an end clamp 40 which cooperates with a second end clamp 42 on the lower end of the battery to clamp the assembly together. Anode 20 in turn extends over the lower end of plastic end plate 38 and is engaged by end clamp 42, the end clamps thereby providing electrical connections for the battery as well as mechanical clamps for the assembly.

Although cathode elements 22 and 24 may again be fabricated of sheet metal in the manner described above and bent over the plastic end plates prior to the attachment of clamp 40, the battery embodiment of FIG. 3 is especially adaptable for use with colloidal cathodic coatings. For example, a colloidal suspension of either copper or carbon in a lacquer base may be brushed or sprayed over the interior surface of the plastic end plates and over one end thereof to provide the necessary cathode surface. If carbon is to be employed, and high currents are anticipated, it is useful to first place a copper layer over the plastic before applying the carbon surface.

Although one may fabricate the battery of FIG. 3 using plastic end plates which are naturally planar, it has been found advantageous to use instead plastic end plates having an initial compound curvature as illustrated in FIG. 4. The particular plastic end plates shown in this view each have a saddle-shaped compound curvature and are formed of a material such as polystyrene which is capable of reasonable flexure without breaking. The end plates may also be fabricated with suitable peripheral ribbing 44 which functions as a stiffener without adding any appreciable weight to the end plates.

The use of curved plastic end plates such as those shown in FIG. 4 in the battery of FIG. 3 results in the same ultimate planar configuration as depicted in the latter view, as a result of which the stressed plastic end plates function to hold the active battery elements in tighter engagement. As shown in FIG. 7, where curve A represents the result of electrical tests on a battery employing curved plastic end plates, and curve B depicts the same test on an otherwise identical battery fabricated in accordance with the invention using planar plastic end plates, the intimate engagement of the battery elements created by the use of the end plates of FIG. 4 increases materially the useful life of the battery.

As stated above, batteries constructed in accordance with FIG. 3 have been found to be especially useful in clip-in applications, such as those found in model toys, for example. For such applications, it is also helpful to form clamps 40 and 42 with extending tabs 46, as shown in both FIGS. 3 and 5, so that the cell is self-centered and rigidly held when inserted in a terminal board such as that shown in FIG. 6.

Considering now the operation of the primary cell of the invention, it has been found that a battery having bibulous elements one inch by two inches in area will become completely saturated for activation by immersion in plain tap water for a period on the order of ten to twenty seconds, after which electrical energy is available in several seconds. It will be appreciated, of course, that salt water is preferred if separators 26 and 28 do not initially contain sodium chloride. It will be further understood that immersion in the activating fluid may be required for a shorter or longer period depending upon the size of the cell's active area, or stated differently, the distance to the center of the cell from the nearest lateral edges. That this is so may be appreciated from the fact that the time required to wet completely a sheet of bibulous material from its periphery is a function of the size of the sheet.

It will be noted that the typical open circuit voltages for cells employing copper, nickel or carbon cathodes with a magnesium anode are substantially less than the theoretical values which one would obtain by adding the primary electrode potentials of the materials as set forth in the electrochemical series. This phenomenon is thought to be due to the peculiar properties of the magnesium anode, and especially the characteristic of magnesium to form a surface hydroxide which, although normally insulative in nature, is removed in accordance with the current demand on the battery to expose basic magnesium therebeneath.

Upon activation of the battery the sodium chloride of the separators and the cupric chloride of the cupric chloride containing material both go into solution readily, the chlorine ions thereafter functioning as current carriers for the electron flow. The generalized electron equations for the cell at the electrodes are in turn thought to be $$Mg \; Mg^{++}+2e$$
$$2e+Cu^{++} \; Cu$$

and in fact copper is plated out upon the cathodes during service while the anode is simultaneously eroded. It should be noted at this point that the use of cupric chloride wherein the copper has a valence of two instead of the unitary valence of cuprous chloride as used in the prior art is thought to account for the fact that higher current capacities are achievable by the battery of the invention. Since, however, the correspondence appears to be less than two-to-one as might be anticipated, it is considered possible that the reaction within the battery may involve an equilibrium reaction whereby some of the copper ions are reduced to unitary valence before plating out.

It will be readily appreciated that the total energy deliverable from any particular single cell, as well as the rate at which the energy may be discharged, is a function of the active area or size of the cell elements, the thickness of the bibulous separators, and the time period over which the cell is employed. It should be noted that the initial use of nickel or carbon in the battery cathode affects primarily the initial availability of energy in the desired quantity, and is not a continuing factor of consequence inasmuch as copper is plated out at the cathode regardless of which material is employed.

With reference once more to FIG. 7, there are shown the comparative results achieved under a constant current drain of 500 milliamperes by a deferred action parallel cell of the type shown in FIG. 3 depicted by curve A, and commercially available carbon-zinc dry cells as depicted by curves C and D representing respectively a size "AA" dry cell and a size "D" dry cell. The particular deferred action cell from which curve A was obtained was fabricated in the following manner.

EXAMPLE I

*Anode*—2⅛″ by 1⅛″ primary magnesium .010 sheet.
*Cathodes*—polystyrene end plates coated with successive colloidal suspensions of copper and carbon in lacquer.
*Separators*—100 white blotting paper 2⅛″ by 1⅛″ in size saturated with iodine free sodium chloride.
*Cupric chloride elements*—100 white blotting paper 2⅛″ by 1⅛″ in size saturated with cupric chloride.
*Weight (dry)*—11.8 grams.
*Weight (activated)*—13.0 grams.

It will be noted from FIG. 7 that the deferred action cell of the invention far outperformed the heavier size "AA" dry cell, and over the design period of 40 minutes also performed substantially better than the approximately seven times heavier size "D" dry cell. Moreover, it may be demonstrated that similar comparative results are produced for larger or smaller constant current drains. For example, with constant current drain of 1 ampere, a cell identical to that which produced curve A in FIG. 7 will outperform substantially a size "D" dry cell for a period approaching one-half hour. On the other hand an identical cell with a constant current drain of 200 milliamperes will outperform a standard size "D" dry cell for a period of an hour or more.

As noted above, the thickness of the bibulous separators employed in the cell of the invention also may be varied, depending upon the ultimate application for which the cell is designed, to provide optimum operation at the rated load for that application. For example, there is shown in FIG. 8 a fragmentary view of a parallel dual cell identical in all respects with the cell of FIG. 3 with the exception that it incorporates an additional pair of salt saturated separators 26a and 28a, respectively. In general it may be stated that the use of additional separators decreases the power available while concomitantly prolonging battery life, and that the total energy deliverable by the battery remains substantially unchanged.

Conversely, the use of thinner separator elements in the cell of the invention increases the rate at which energy may be extracted. Thus for application where it is desired to extract more instantaneous power than that shown by curve A in FIG. 7, for example, but for a slightly shorter period of time, it is useful to employ 60 commercial grade blotting paper in the battery separators in lieu of 100 as specified above in Example I.

Continuing, there are certain applications wherein it is highly desirable to operate deferred action cells for only very brief periods at very high power levels, as for example in free flight operation of high-performance model airplanes. With reference now to FIGS. 9 through 11 there are shown respectively two views of a four cell deferred action battery constructed for such an application, and a curve illustrating the power output versus time for the cell obtained when connected to a miniature electric motor load.

As shown in FIG. 9 this particular cell includes four series connected individual cells having four associated anodes 20a through 20d made of sheet magnesium, four sodium chloride saturated separators respectively designated 50a through 50d, four cupric chloride saturated bibulous layers 52a through 52d, and four cathodes designated 54a through 54d. It will be noted that anode 20a may be fabricated simply from a sheet of magnesium, while cathode 54d may be fabricated with a copper, nickel or carbon surface in any of the manners described previously. The three cathodes 54a through 54c, however, are affixed rigidly to anodes 20b through 20d, respectively, and are preferably fabricated either by plating one surface of the three intermediate magnesium anodes with copper, or by spraying one surface of the intermediate anodes with a colloidal dispersion of copper in a lacquer base. Excellent results have been achieved utilizing the aforementioned Acheson Colloids Company's "Dispersion No. 235." This particular dispersion is composed of colloidal copper suspended in a nitro-cellulose resin with the solids constituting 66% by weight and the remainder being volatile organic solvent.

It should be emphasized at this point that it is extremely important when forming cathodes 54a through 54c on anodes 50b through 20d to be certain that none of the cathode area contains holes or apertures through which the magnesium is exposed, at least adjacent blotters 52a through 52c. The reason for this requirement is to prevent the formation of "back batteries" between the constituent layers of the anode-cathode elements since any such action will oppose the normal current flow of the individual cells.

As further shown in FIG. 9, it is also desirable to employ separators and cupric chloride containing elements whose lateral periphery is smaller than the lateral periphery of the anodes and cathodes, or in other words, so that the separators are undercut. This is also done to prevent "back-battery" formation which might otherwise be caused at the exposed edges of anodes 20b through 20d by electrolyte from the separators and blotters if the lateral peripheries were coextensive.

Finally, it will be noted that separators 50a through 50d as shown in FIG. 9 are much thinner than the bibulous layers 52a through 52d, the selection of thinner separators being dictated by the fact that the particular cell shown is intended for use over a very short period of time. Conventional chemical filter paper has been found especially useful as separator material in this type of application.

As shown in FIGS. 9 and 10 the entire assembly may be sandwiched together by a pair of eyelets or apertured rivets 60 and 62. As shown in detail in FIG. 9, an insulative sleeve 64 of a material such as polyvinyl chloride is first inserted through registered apertures in the battery elements. Eyelet 60 is then inserted through the sleeve until its head contacts anode 20a after which the other end is swaged over an insulating washer 66. Thus, eyelet 60 provides a receptacle for a taper pin electrical connection to the outside anode 20a. Conversely, eyelet 62 contacts cathode 54d, and is insulated from anode 20a by a second insulating washer 68 at the right-hand end of the assembly as viewed in FIG. 10.

Insulative sleeve 64 is used to accomplish a two-fold purpose, namely, to insulate the eyelets from the intermediate battery anodes and cathodes, and to seal the internal edge of the apertures in these elements to prevent "back battery" action when the cell is activated. To insure accomplishment of this latter function, the apertures in the battery elements should be very nearly the name diameter as the outside diameter of sleeve 64, while the initial length of sleeve 64 should be slightly larger than the thickness which the sandwiched battery elements will present when stacked and fastened. In this manner the swaging of eyelets 60 and 62 exerts axial forces on the associated sleeves which causes the sleeves to expand or bulge laterally and thus seal against the apertures in the intermediate anode-cathode elements.

To illustrate the capability of a deferred action cell such as that shown on FIGS. 9 and 10, there is shown in FIG. 11 the power curve of a battery fabricated in accordance with the following Example II when the battery was connected to a typical miniature electric motor of the type manufactured for the toy industry.

EXAMPLE II

Anodes—¾" by 2⅛" primary magnesium .018 sheet.
Cathodes 54a through 54c—spray copper coating of Acheson Colloids Dispersion 235 over one surface of associated anodes.
Cathode 54d—spray coating of Dispersion 235 over .020 aluminum stock.
Separators—No. 5 chemical filter paper ⅝" by 2" saturated with NaCl.
Cupric chloride elements—100 white blotting paper ⅝" by 2" saturated with cupric chloride.
Weight (dry)—7.0 grams.
Weight (activated)—7.9 grams.

It will be noted from FIG. 11 that the energy output of the cupric chloride cell is ideally suited for short-term applications where substantial power is required of an extremely low-weight cell, such as in free-flying model airplanes for example. Moreover, it will be noted that the energy output therefrom exceeds substantially that provided by a pair of relatively expensive silver chloride cells designed especially for the identical application.

It will be appreciated of course that deferred action cells embodying the principles of the present invention may take numerous other physical forms. For example, there is shown in FIG. 12 a primary battery which again incorporates a pair of parallel deferred action cells in the same manner as the battery of FIGS. 2 and 3. As shown in FIG. 12, the various active elements of the battery are clamped between a pair of plastic end plates 36 and 38, which in turn are fixed together by a pair of plastic rivets 70 and 72.

The anode and cathodes employed in the battery of FIG. 12 are preferably stamped or otherwise fashioned from sheet stock to form the configuration shown in FIG. 13 with a pair of apertures 74 and 76 for receiving plastic rivets 70 and 72. In addition, each of the anode and cathode elements is provided with a connector eyelet 78 at one end thereof and a recessed region 80 at the opposite end. As shown in FIG. 12, these latter features provide access for connecting to both anode 20 and cathodes 22 and 24 (only cathode 22 being visible in FIG. 12). A typical fixed connector board for this particular form of cell is shown in FIG. 14, and includes an insulating board 82 in which are swaged a pair of taper pin connector terminals 84 and 86 positioned to register with the eyelets 78 in the battery of FIG. 12.

It should be understood that numerous other deferred action primary cells following the teachings of the present invention may be envisaged without departing from the scope of the invention. For example, while the anode of the battery has been described as being fabricated from magnesium, it will be appreciated that the anode may also be fabricated of other base materials with a coating of magnesium. Again, while the cupric chloride containing elements have been specifically described with reference to blotting paper as the bibulous base material thereof, it will be appreciated that any other porous fiberous material, such as chemical filter paper or tightly wadded fiberglass, may be employed in constructing the cells. In addition, it will be appreciated that while the invention has been described hereinabove with reference to a saturated cupric chloride solution, the invention could also be practiced by utilizing a lower concentration of cupric chloride in solution. Accordingly, it is to be expressly understood that the spirit and scope of the invention are to be limited only by the spirit and scope of the appended claims.

What is claimed as new is:

1. A deferred action primary cell activatable by immersion in water, said cell comprising: an anode composed essentially of magnesium; a cathode including a surface facing said anode, said cathode at said surface being composed essentially of an element selected from the group consisting of copper, nickel and carbon; and a layer of bibulous material sandwiched between said anode and said cathode, said layer being in contact with said cathode and containing crystals of cupric chloride dispersed therein.

2. The primary cell defined in claim 1 which further includes a second layer of bibulous material sandwiched between and in contact with said anode and said layer containing cupric chloride, said second layer containing crystals of sodium chloride, and means for maintaining said anode, cathode and bibulous layers in pressure contact.

3. A deferred action primary cell comprising: a sheet of magnesium forming an anode; a first layer of sodium chloride containing bibulous material in contacting engagement with said magnesium sheet; a second layer of bibulous material containing cupric chloride crystals in contacting engagement with said first layer; and a cathode including a conducting surface in contacting engagement with said second layer, said conducting surface being composed essentially of an element selected from the group consisting of copper, nickel and carbon.

4. The combination defined in claim 3 wherein said cathode comprises a plastic sheet with one side thereof coated with one or more of the elements selected from the group consisting of copper, nickel and carbon.

5. In a deferred action primary cell which includes a magnesium anode and which is activatable by immersion in water, the combination comprising: a cathode having a conducting surface facing said anode, said cathode at said surface being composed essentially of an element selected from the group consisting of carbon, nickel and copper; and a layer of bibulous material compressed between and separating said anode and the cathode, at least the portion of said layer of bibulous material adjacent said cathode having cupric chloride crystals dispersed therein.

6. The combination defined in claim 5 wherein the said cupric chloride crystals are dispersed within the region of said bibulous layer nearest said cathode, and which further includes sodium chloride crystals dispersed within the region of said bibulous layer nearest said anode.

7. A deferred action primary cell comprising: an anode composed essentially of magnesium; first and second cathode elements disposed on opposite sides of said anode, at least the surface of each of said cathode elements facing said anode being composed essentially of an element selected from the group consisting of carbon, nickel and copper; first and second layers of bibulous material in contacting engagement with and respectively separating said first and second cathode elements from said anode, the region of each of said bibulous layers adjacent the associated cathode element being impregnated with cupric chloride crystals; and means for electrically interconnecting said cathode elements.

8. The primary cell defined in claim 7 which further includes a pair of insulating end plates positioned contiguous with said cathode elements on the sides thereof remote from said anode; and fastener means coupled to said end plates for clamping said cathode elements, said bibulous layers and said anode in pressure contact.

9. The primary cell defined in claim 8 wherein each of said insulating end plates comprises a substantially rectangular plastic sheet formed with a saddle-shaped compound curvature, and wherein said fastener means comprise a pair of clamps for tightly clamping the narrow edges of one of said end plates to the corresponding narrow edges of the other of said end plates, said end plates being oriented with respect to the cathode elements so that said end plates assume a planar configuration when clamped to each other.

10. The primary cell defined in claim 9 which further includes means for electrically connecting said magnesium anode to one of said clamps, and means for electrically connecting said cathode elements to the other of said clamps.

11. The primary cell defined in claim 8 wherein said cathode elements comprise a copper coating on the surface of each of said end plates facing said anode.

12. A deferred action primary series cell, said cell comprising: first and second anode elements composed essentially of magnesium, first and second cathode elements composed essentially of an element selected from the group consisting of copper, nickel and carbon, said second cathode element being bonded to one side of said first anode element; and first and second layers of bibulous material separating said first cathode from said first anode and third and fourth bibulous layers separating said second cathode from said second anode, each bibulous layer adjacent the associated cathode element containing cupric chloride crystals.

13. The cell defined in claim 12 wherein said first and second anode elements are formed from sheet magnesium, and wherein said second cathode comprises a layer of copper deposited on one side of said first magnesium sheet.

References Cited by the Examiner

UNITED STATES PATENTS

| | | | |
|---|---|---|---|
| 2,050,173 | 8/1936 | Gordon | 136—100 |
| 2,306,409 | 12/1942 | Ruben | 136—100 |
| 2,543,106 | 2/1951 | Harriss | 136—90 |
| 2,547,907 | 4/1951 | Fry et al. | 136—100 |
| 2,658,935 | 11/1953 | Chubb | 136—100 |
| 2,716,671 | 8/1955 | Dines | 136—90 |
| 2,790,893 | 4/1957 | Lane | 136—90 |
| 2,928,890 | 3/1960 | Van Der Grinten et al. | 136—137 |
| 2,988,587 | 6/1961 | Haring | 136—90 |

ALLEN B. CURTIS, *Primary Examiner.*

JOHN R. SPECK, MURRAY TILLMAN, JOHN H. MACK, *Examiners.*

H. FEELEY, B. J. OHLENDORF, *Assistant Examiners.*